US011068518B2

(12) United States Patent
Guo et al.

(10) Patent No.: US 11,068,518 B2
(45) Date of Patent: Jul. 20, 2021

(54) REDUCING NEGATIVE EFFECTS OF SERVICE WAITING TIME IN HUMANMACHINE INTERACTION TO IMPROVE THE USER EXPERIENCE

(71) Applicant: International Business Machines Corporation, Armonk, NY (US)

(72) Inventors: Shang Q. Guo, Cortlandt manor, NY (US); Maharaj Mukherjee, Poughkeepsie, NY (US); Jonathan Lenchner, North Salem, NY (US); John S. Murdock, Jr., New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 15/981,946

(22) Filed: May 17, 2018

(65) Prior Publication Data

US 2019/0354630 A1    Nov. 21, 2019

(51) Int. Cl.
| | |
|---|---|
| *G06F 16/332* | (2019.01) |
| *G10L 15/22* | (2006.01) |
| *G10L 15/08* | (2006.01) |
| *G06F 16/35* | (2019.01) |
| *G06F 16/951* | (2019.01) |
| *G06F 16/33* | (2019.01) |

(52) U.S. Cl.
CPC ...... *G06F 16/3329* (2019.01); *G06F 16/3334* (2019.01); *G06F 16/35* (2019.01); *G06F 16/951* (2019.01); *G10L 15/08* (2013.01); *G10L 15/22* (2013.01); *G10L 2015/225* (2013.01)

(58) Field of Classification Search
USPC ...................................... 704/1–504
See application file for complete search history.

(56) References Cited

U.S. PATENT DOCUMENTS

| | | | | |
|---|---|---|---|---|
| 7,672,841 | B2 * | 3/2010 | Bennett | G10L 15/30 704/215 |
| 8,185,517 | B1 * | 5/2012 | Wood | G06Q 10/00 707/713 |
| 9,537,924 | B2 * | 1/2017 | Barnett | G06F 3/0484 |
| 9,542,854 | B2 * | 1/2017 | Anand | G09B 7/02 |
| 9,781,212 | B2 * | 10/2017 | Briere | G06F 16/2379 |
| 10,152,756 | B2 * | 12/2018 | Isaacson | G06Q 20/384 |
| 2002/0107842 | A1 * | 8/2002 | Biebesheimer | G06F 16/951 |

(Continued)

FOREIGN PATENT DOCUMENTS

CN     106182007 A    12/2016

*Primary Examiner* — Marcus T Riley
(74) *Attorney, Agent, or Firm* — Garg Law Firm, PLLC; Rakesh Garg; Anthony Curro

(57) ABSTRACT

A query including a question from a user is received by a device. It is determined that the question and an associated answer is not found in a local cache of the device. At least one category for the question is determined. At least one cloud service for answering the question is determined. The at least one cloud service is in communication with the device via a network. A request including the question is sent to the at least one cloud service. Selecting a behavior is selected based upon the at least one category. The behavior includes a feedback to the user to reduce a perceived waiting time by the user. The behavior is executed.

20 Claims, 5 Drawing Sheets

(56) References Cited

U.S. PATENT DOCUMENTS

| | | | |
|---|---|---|---|
| 2009/0041209 A1* | 2/2009 | Agapi | H04M 3/4285 |
| | | | 379/87 |
| 2012/0288844 A1* | 11/2012 | Anand | G09B 7/08 |
| | | | 434/353 |
| 2014/0108448 A1* | 4/2014 | Daniel | G06F 16/9038 |
| | | | 707/769 |
| 2015/0073907 A1* | 3/2015 | Purves | G06Q 20/32 |
| | | | 705/14.58 |
| 2016/0163215 A1* | 6/2016 | Anand | G09B 7/06 |
| | | | 434/353 |
| 2018/0232817 A1* | 8/2018 | Isaacson | G06F 16/951 |
| 2018/0373547 A1* | 12/2018 | Dawes | G06F 16/90332 |
| 2019/0095478 A1* | 3/2019 | Tankersley | G06F 16/2379 |
| 2019/0354630 A1* | 11/2019 | Guo | G06F 16/951 |

* cited by examiner

REDUCING NEGATIVE EFFECTS OF SERVICE WAITING TIME IN HUMANMACHINE INTERACTION TO IMPROVE THE USER EXPERIENCE

TECHNICAL FIELD

The present invention relates generally to a method, system, and computer program product for improving human-machine interaction. More particularly, the present invention relates to a method, system, and computer program product for reducing negative effects of service waiting time in human-machine interaction to improve the user experience.

BACKGROUND

A question and answer system (Q and A system) is an artificial intelligence application executing on data processing hardware. A Q and A system answers questions pertaining to a given subject-matter domain presented in natural language. Typically, a Q and A system is provided access to a collection of domain specific information based on which the Q and A system answers questions pertaining to that domain. For example, a Q and A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain.

SUMMARY

The illustrative embodiments provide a method, system, and computer program product. An embodiment of a method includes receiving, by a device, a query including a question from a user, and determining that the question and an associated answer is not found in a local cache of the device. The embodiment further includes determining at least one category for the question, and determining at least one cloud service for answering the question. In the embodiment, the at least one cloud service is in communication with the device via a network. The embodiment further includes sending a request including the question to the at least one cloud service, and selecting a behavior based upon the at least one category. In the embodiment, the behavior includes a feedback to the user to reduce a perceived waiting time by the user. The embodiment further includes executing the behavior.

Another embodiment further includes determining that a response to the request has not been received from the at least one cloud service within a first predetermined time period, and selecting an additional behavior. In the embodiment, the additional behavior includes an additional feedback to the user to reduce the perceived waiting time by the user. The embodiment further includes executing the additional behavior.

Another embodiment further includes determining that the response to the request has not been received from the at least one cloud service within a second predetermined time period, and providing an alternative option to the user. In another embodiment, selecting the additional behavior includes selecting a behavior having a shortest execution time length among available behaviors in the determined category.

Another embodiment further includes determining that a response to the request has been received from the cloud services, and providing an answer received in the response to the user.

In another embodiment, determining at least one category for the question utilizes a natural language classifier. In another embodiment, determining at least one category for the question includes matching a keyword in the question to a keyword associated with a category.

In another embodiment, selecting the behavior is further based upon an execution time length of the behavior. In another embodiment, selecting the behavior is further based upon an estimated response arrival time of a response from the at least one cloud service. In another embodiment, the behavior is selected from available behaviors in the category such that a time difference between when the behavior execution ends and an arrival time of a response from the at least one cloud service is minimized.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
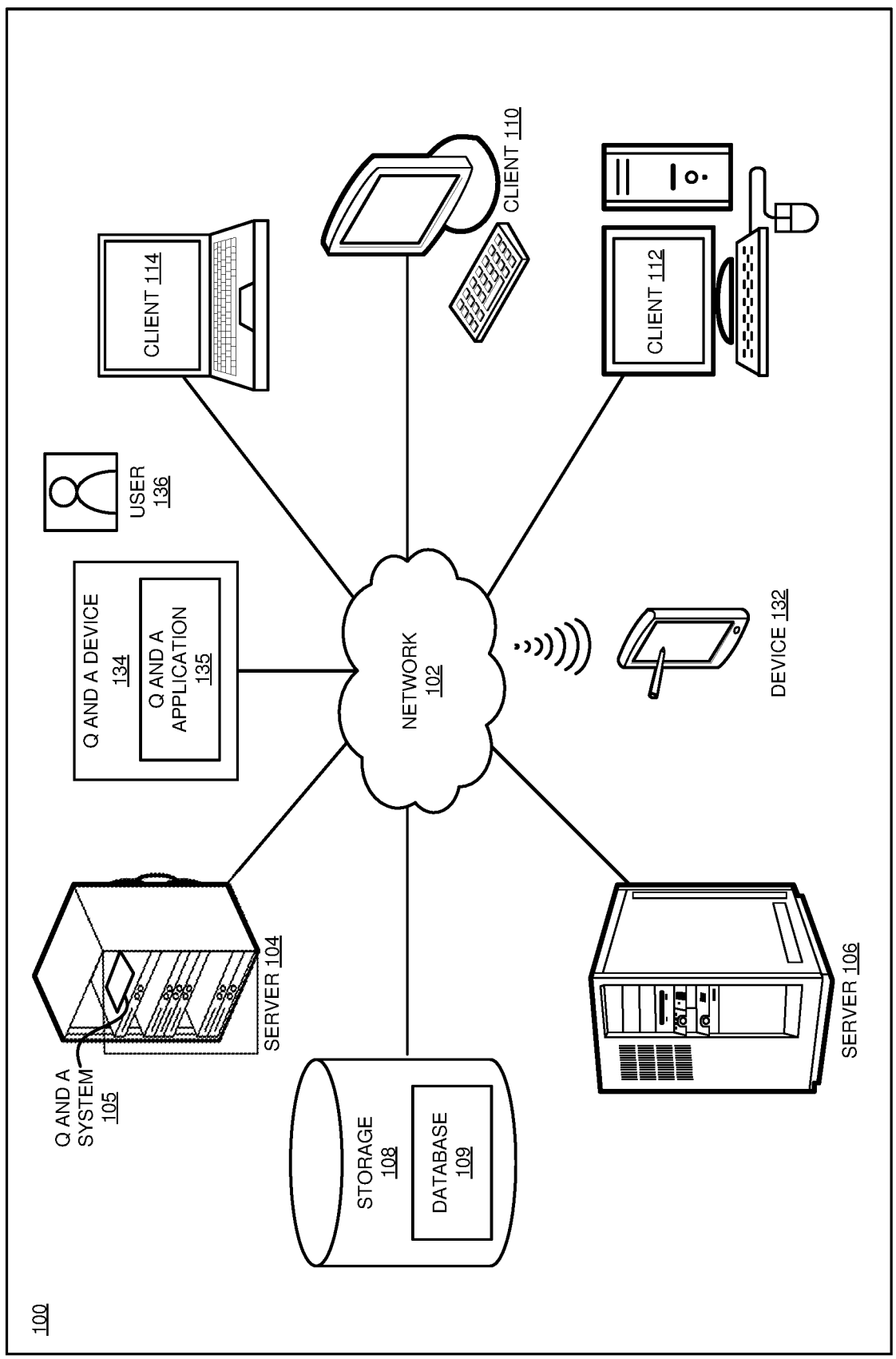
FIG. 1 depicts a block diagram of a network of data processing systems in which illustrative embodiments may be implemented.

Human-computer interaction systems often use services located within a network cloud to facilitate interaction between a human and a computer or other machine. When a human-machine interaction system uses services in a cloud, it takes time to a request to the service and receive a response from the service. Sometimes, a certain task requires a call to multiple cloud services in sequence. For example, in a question and answer (Q&A) system, a user asks a question, and a type of the question is identified via a Natural Language Classifier (NLC). The type of the question is sent to a dialog service in the cloud before obtaining an answer to return to the user. The dialog service may also need to call other types of services in the cloud such as a face recognition service in order to personalize the response to the user.

Waiting time in a human-computer interaction greatly affects user satisfaction and the user experience. Existing solutions in human-computer interfaces often display a progress bar to report a remaining waiting time which can improve the user experience in some situations. However, in other situations, such as when interacting with a humanoid robot in a Q&A dialog, displaying a progress bar may not be practical or desirable.

The illustrative embodiments used to describe the invention generally address and solve the above-described problems and other problems related to reducing negative effects of service waiting time in a human-machine interaction.

One or more embodiments are directed to a method, system, and computer program product for reducing negative effects of service waiting time in a human-machine interaction to improve the user experience and/or improve user satisfaction.

One or more embodiments provide for reducing negative effects of service waiting time in a human-machine interaction by providing a more natural interaction during the service waiting time. In an embodiment, a Q&A system stores the most frequently asked question/answer pairs in a local cache and dynamically refreshes the local cache when necessary if an answer is changed. For example, Q&A system may cache today's weather, a stock price at the end of the day, and/or an answer to any other frequently asked question in the local cache. Upon receiving a question from a user, the Q&A system first checks to determine whether the question matches a question in the local cache. If the question is found in the local, an associated answer stored in the local cache is provided to the user. Otherwise, the Q&A system sends the question to one or more relevant cloud services. At the same time, the Q&A system selects and executes a behavior intended to reduce the negative effects of waiting time on the user while waiting for the service(s) to respond. For example, the Q&A system the behavior may include inducing a particular robotic movement in a robot, or outputting a particular dialog via an audio output with the intent to reduce the negative effects of waiting time on the user. For example, if the question for the Q&A system is "Do you know me?" which may require significant wait time for necessary services to process and complete, the Q&A system may hide the perceived waiting time by responding with "Hmmm, let me take a good look at you . . . " while waiting for the request to be completed.

In an embodiment of a method for improving user experience and satisfaction in human-machine dialog by reducing the perceived negative effects of service waiting time includes selecting and executing an appropriate behavior while waiting for required services to complete. In the embodiment, a Q&A system receives a question from a user and determines services needed to answer the question and the minimal time required to complete all of the services. The Q&A system selects a behavior appropriate to the question and the estimated minimal time for the services to complete, and executes the selected behavior.

If the service(s) respond with an answer to the question within the expected time, then the Q&A system responds with the answer. Otherwise, the Q&A system iteratively selects and executes one or more appropriate additional behaviors and determine a maximal time out threshold for services to complete. If the threshold time is exceeded, the Q&A system responds that it is unable to answer the question at this time and offers the user the option of repeating the question at a later time or asking a different question.

In one or more embodiments, a behavior used for reducing the negative effects of service waiting time is referred to as a "prior-behavior". In particular embodiments, possible prior-behaviors include dialog such as "Hmmmm, let me think about it", "Oh, that's a good question.", "Yeah, an interesting question", "Oh, well.", "You know what, this is a very good question.", and "Oh, I thought you knew it."

In one or more embodiments, each prior-behavior has an associated execution time length, and a particular prior-behavior is selected based upon its associated execution time length and the determined time for the services to complete. In one or more embodiment, prior-behaviors are grouped into categories in which a particular prior-behavior may belong to more than one category. For example, some behaviors may be more generic an belong to all categories while other behaviors may be keyword specific. For example, if question is categorized as a "Where" question, a prior-behavior may be an output dialog of "Oh, you want to know the place?". In some embodiments, some prior-behaviors may be suitable only for certain user genders or ages and are selected according to user profile data stored in a user profile associated with the user.

In one or more embodiments, a gap is a difference between a time that a prior-behavior execution ends and a response arrival time. In an embodiment, a Q&A application in a Q&A device calculates a selected prior-behavior by first determining a category of question. In a particular embodiment, a Q&A application uses keyword matching of keywords in the question to identify one or more categories of the question. Examples of keywords that may be used to determine a category of a question include "How", "Where", "What", "Who", "When". In the embodiment, if no keywords matching a category are found in the question, the Q&A application uses a generic category.

In the embodiment, the Q&A application finds an optimal prior-behavior in a main waiting phase based on one or more current networking performance indicators, estimates a response arrive time based upon the one or more networking performance indicators, and selects a behavior in the selected categories so that a gap reaches a minimal value. Accordingly, the execution of the prior-behavior results in minimization of the perceived waiting time of the user.

In an iterative phase, the Q&A application selects the prior-behavior with the shortest execution time in the one or more categories, and executes the selected prior-behavior and may select additional prior-behaviors during the iterative phase until a result is received from the cloud services. In one or more embodiments, the Q&A application avoids reusing the same prior-behavior during the iterative phase of a particular Q&A dialog. In one or more embodiments, the result includes the answer to the question. In one or more embodiments, if a response is not received from the cloud service(s) within a predetermined time-out period, the Q&A application provides options to the user such as either asking the question at a later time or asking a different question.

The manner of reducing negative effects of service waiting time in a human-machine interaction to improve the user experience is unavailable in the presently available methods. A method of an embodiment described herein, when implemented to execute on a device or data processing system, comprises substantial advancement of the functionality of that device or data processing system in reducing negative effects of service waiting time in a human-machine interaction to improve the user experience.

An embodiment can be implemented as a software application. The application implementing an embodiment can be configured as a modification of an existing health status detection system, as a separate application that operates in conjunction with an existing health status detection system, a standalone application, or some combination thereof.

The illustrative embodiments are described with respect to certain types of behaviors, Q&A devices, Q&A procedures and algorithms, caches, cloud services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
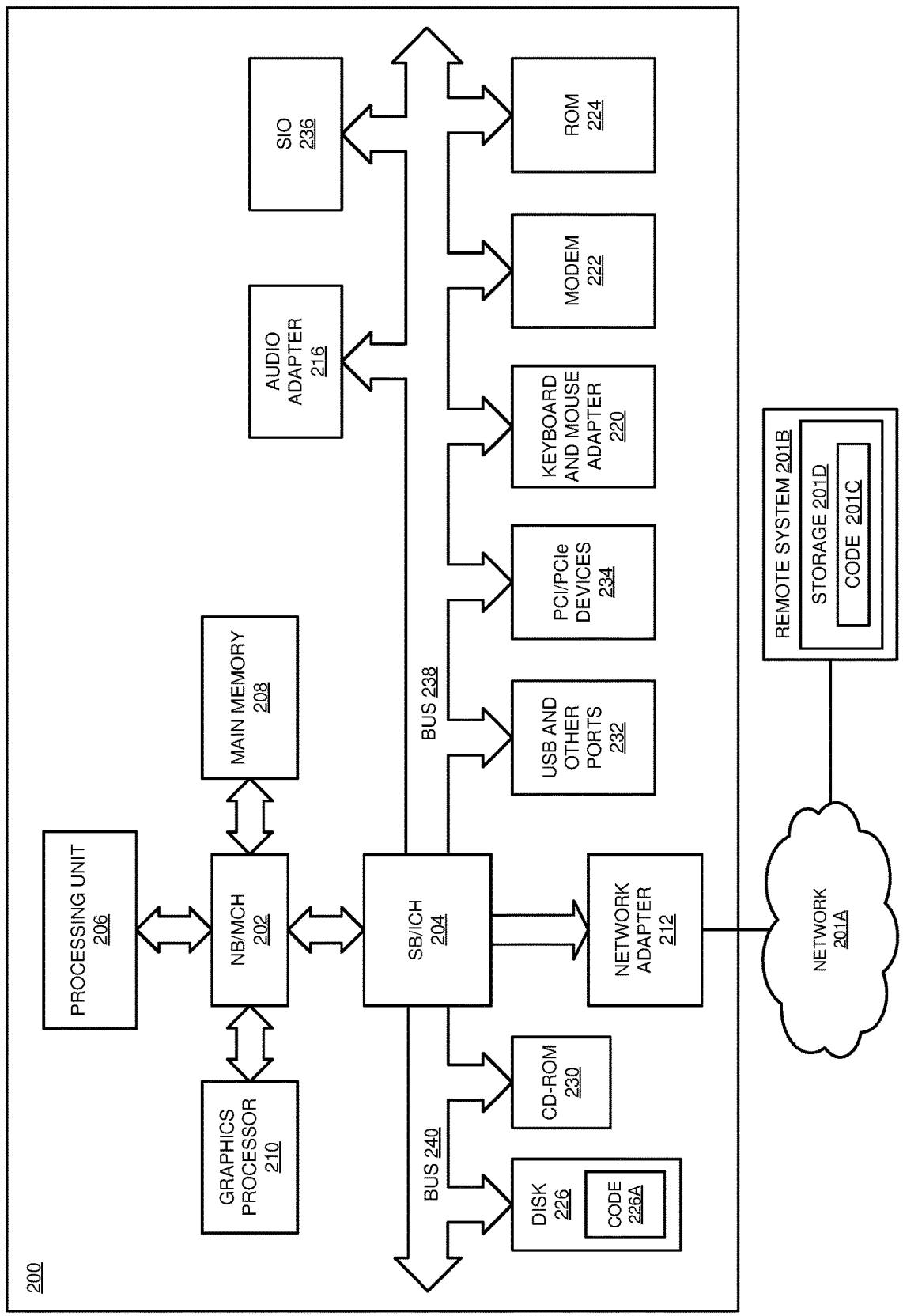
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes a client application 134 configured to perform functions of client application 134 described herein. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Q & A device 134 is configured to receive a question from a user 136 and provide an answer to the question to user 136 as described herein. For example, Q&A device 134 can take the form of a robot, a smart speaker, a smartphone, a tablet computer, a laptop computer, client 110 in a stationary or a portable form, a wearable computing device, or any other suitable device configured for implementing a Q & A dialog with a user. Q&A device 134 includes a Q&A application 135. Q&A application 135 may be configured to implement one or more of the functions described herein for reducing negative effects of service waiting time in human-machine interaction to improve the user experience. Database(s) 109, such as a user profile database and/or a Q&A pair database, may be stored in storage 108 as shown or supplied by another source (not shown).

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes a Q&A system 105 that implements an embodiment of Q&A cloud services described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
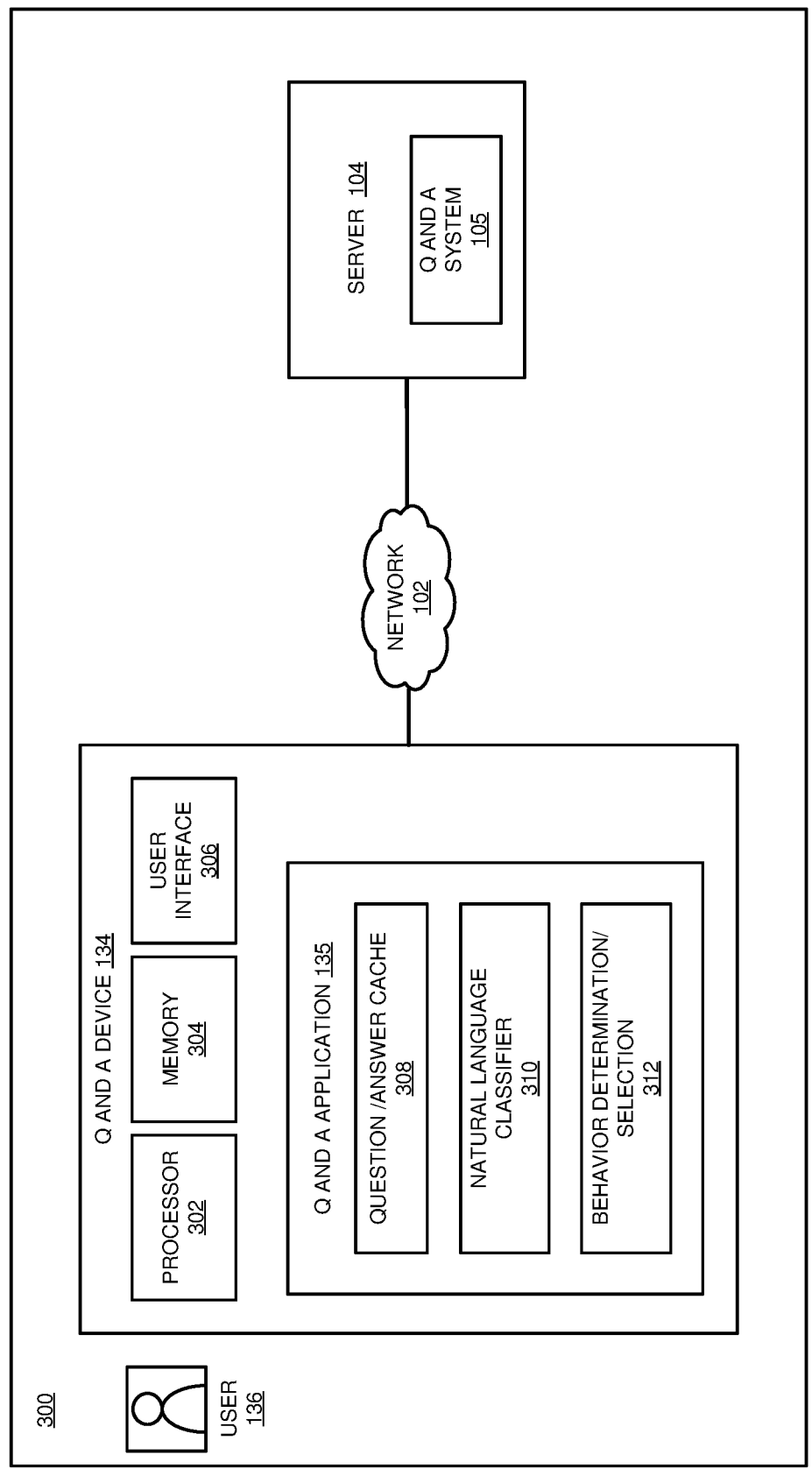
FIG. 3 depicts a block diagram of an example configuration for reducing negative effects of service waiting time in human-machine interaction to improve the user experience in accordance with an illustrative embodiment.

With reference to FIG. 3, this figure depicts a block diagram of an example configuration 300 for reducing negative effects of service waiting time in human-machine interaction to improve the user experience in accordance with an illustrative embodiment. The example embodiment includes Q&A device 134 and server 104 in communication via network 102. Q&A device 134 is an example of Q&A device 134 of FIG. 1 and includes a processor 302, a memory 304, a user interface 306, and Q&A application 135. Processor 302 is configured to retrieve instructions from memory 304 and execute the instructions to perform various operations of Q&A device 134 as described herein. In one or more embodiments, user interface 306 is configured to allow user 136 to interact with Q&A device 134 during a Q&A dialog such as by a voice input or text input. Q&A application 135 includes a question/answer cache 308, a natural language classifier 310, and a behavior determination/selection component 312. Question/answer cache 308 is configured to locally store a number of question/answer pairs including frequently asked questions and associated answers. Natural language classifier 310 is configured to receive an input, such as a voice or text input, in a natural language and determine a classification of the input using machine-learning techniques. In one or more embodiments, the classification of the input includes determining a category of a question in the input. Behavior determination/selection component 312 is configured to determine and/or select a prior-behavior as described herein. Server 104 is an example of server 104 of FIG. 1 and includes a cloud service based Q&A system as described herein.

Figure 4:
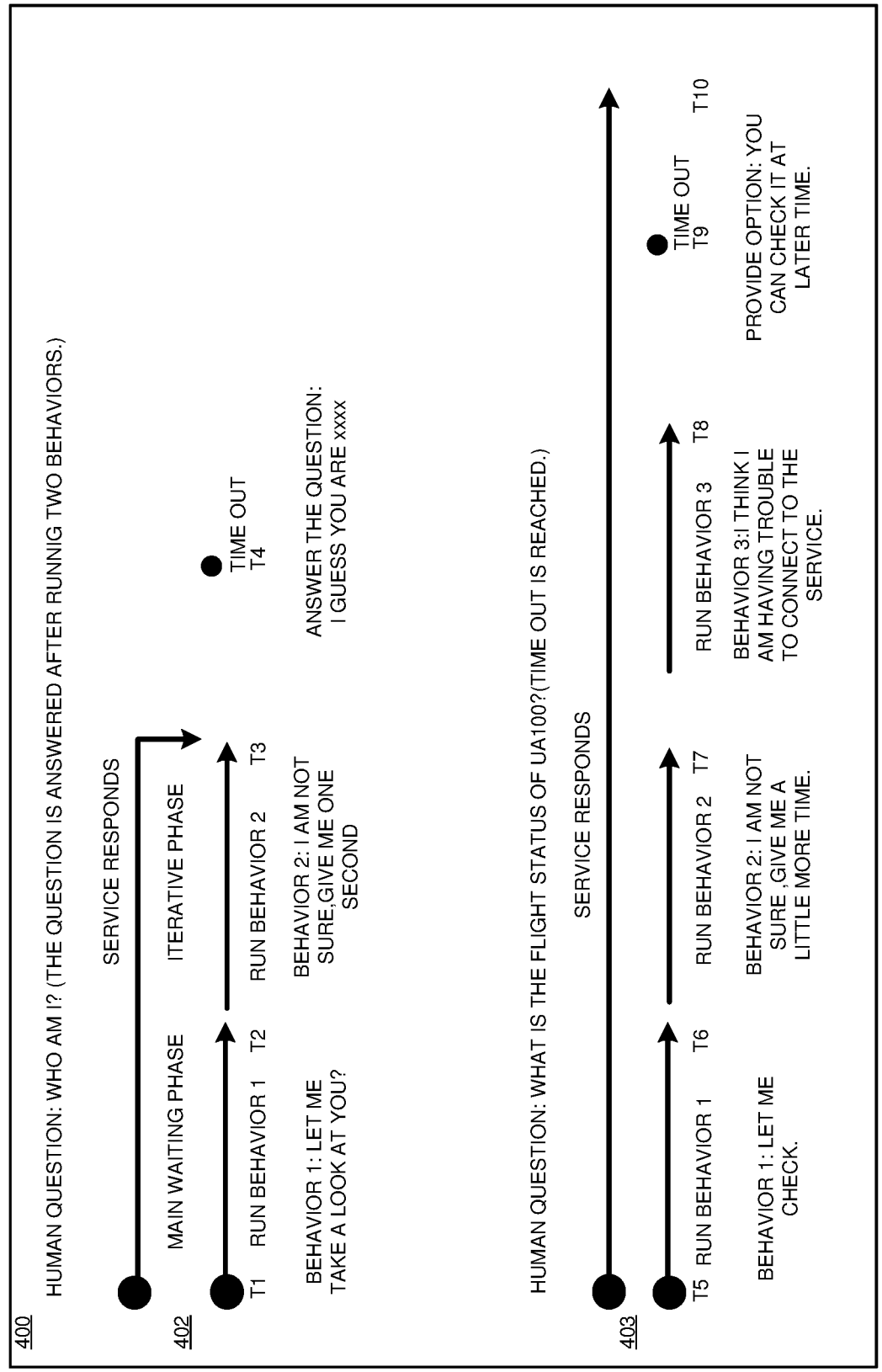
FIG. 4 depicts example Q&A dialogs in accordance with an illustrative embodiment.

With reference to FIG. 4, this figure depicts example Q&A dialogs in accordance with an illustrative embodiment. The illustration of FIG. 4 depicts a first Q&A dialog 402 and a second Q&A dialog 403. In the first Q&A dialog 402, a question asked by user 136 is answered after two behaviors are run by Q&A application 135. In the first Q&A dialog 402, user 136 submits a question to Q&A application 135 of Q&A device 134 of "WHO AM I?". During a main waiting phase at time T1, Q&A application 135 sends a request for an answer to the question to a cloud service provided by Q&A system 105, determines a first behavior, and runs the first behavior. In the embodiment, the first behavior includes presenting an output dialog of "LET ME TAKE A LOOK AT YOU?" to user 136. During an iterative phase at time T2, Q&A application 135 determines a second behavior, and runs the second behavior. In the embodiment, the second behavior includes presenting an output dialog of "I AM NOT SURE, GIVE ME ONE SECOND" to user 136. At time T3, the service responds with an answer of "I GUESS YOU ARE xxxx" prior to a time-out time T4. Accordingly, the question is answered after the running of two behaviors.

In the second Q&A dialog 403, user 136 submits a question to Q&A application 135 of Q&A device 134 of "WHAT IS THE FLIGHT STATUS OF UA100?". During a main waiting phase at time T5, Q&A application 135 sends a request for an answer to the question to a cloud service provided by Q&A system 105, determines a first behavior, and runs the first behavior. In the embodiment, the first behavior includes presenting an output dialog of "LET ME CHECK" to user 136. During an iterative phase at time T7, Q&A application 135 determines a second behavior, and runs the second behavior. In the embodiment, the second behavior includes presenting an output dialog of "I AM NOT SURE, GIVE ME A LITTLE MORE TIME" to user 136. At time T7, the service has not yet responded and Q&A application 135 determines a third behavior, and runs the third behavior. In the embodiment, the third behavior includes presenting an output dialog of "I THINK I AM HAVING TROUBLE CONNECTING TO THE SERVICE" to user 136. At a time T8, Q&A application 135 determines that there is not enough time to run an additional behavior before a time-out period T9 is reached. At time T9, the time-out period has been exceeded without a response having been received from the service. At time T10, Q&A application 135 provides an alternative option of "YOU CAN CHECK IT AT A LATER TIME" to user 136. Accordingly, time-out is reached before receiving a response for the service.

Figure 5:
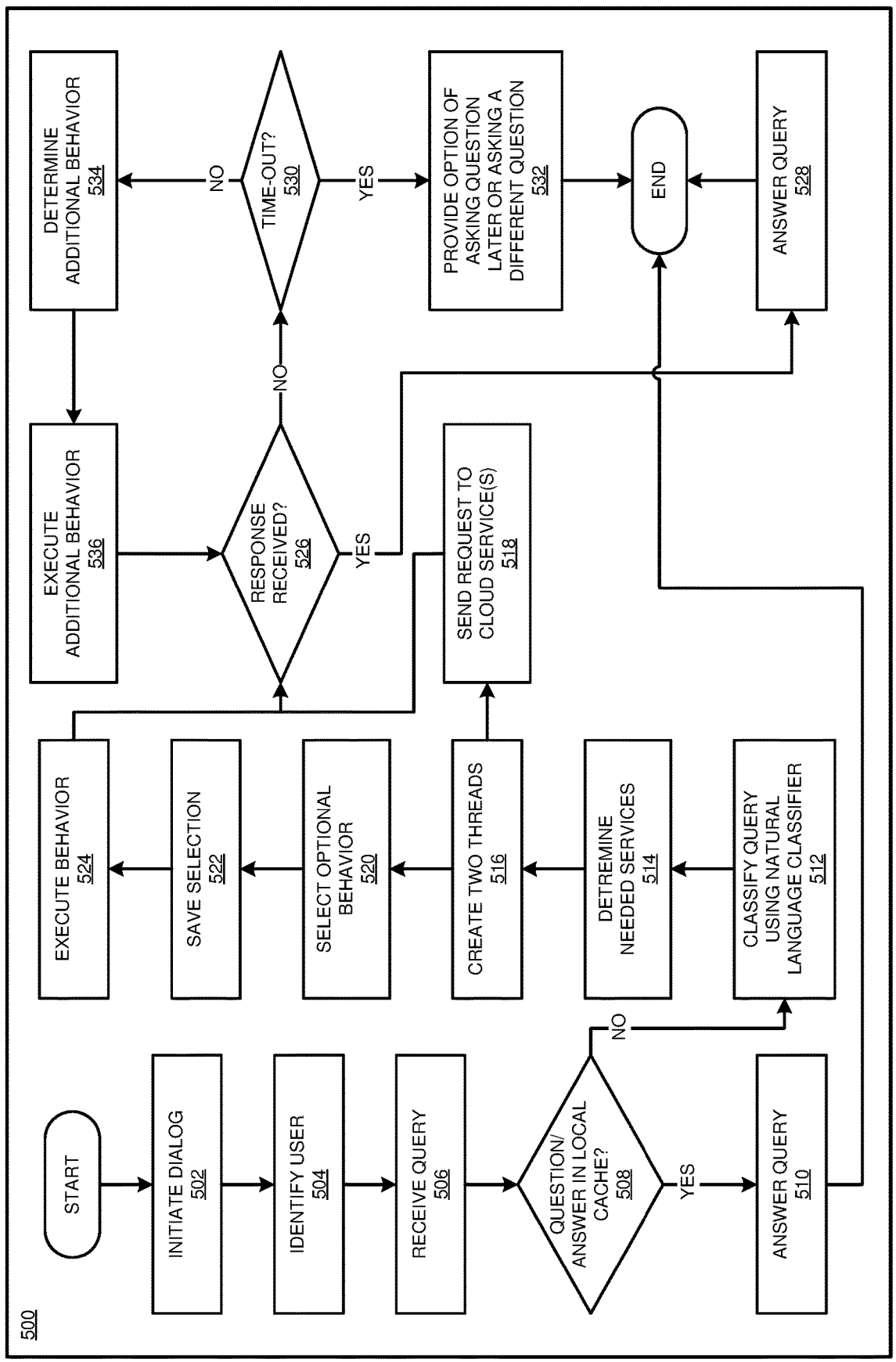
FIG. 5 depicts a flowchart of an example process for reducing negative effects of service waiting time in human-machine interaction in accordance with an embodiment.

With reference to FIG. 5, this figure depicts a flowchart of an example process 500 for reducing negative effects of service waiting time in human-machine interaction to improve the user experience in accordance with an embodiment. In 502, a dialog is initiated between user 136 and Q&A device 134. In 504, Q&A application 135 identifies user 136. In a particular embodiment, Q&A application 135 identifies user 136 using voice recognition. In 506, Q&A application 135 receives a query including a question from user 136. In 508, Q&A application 135 determines whether the question and an associated answer is found in local cache 306. If a match is found between the question included in the query and a question/answer pair in cache 306, Q&A application 135 answers the query with the matching answer and process 500 ends.

If a match is not found between the question including in the query, in 512, Q&A application 135 classifies the query using natural language classifier 310 to determine a classification label for the query. In a particular embodiment, Q&A application 135 determines a classification of the query using machine-learning techniques. In one or more embodiments, the classification of the query includes determining a category of a question in the query. In a particular embodiment, Q&A application 135 uses keyword matching of keywords in the question to identify one or more categories of the question.

In 514, Q&A application 135 determines one or more cloud services need to needed to answer the question. In one or more embodiments, Q&A application 135 further determines a minimal time required for the cloud services to answer the query.

In 516, Q&A application 135 creates two threads at substantially the same time in which a first thread is configured for sending a request to the cloud service(s) and the second thread is for selecting and executing one or more behaviors to reduce negative effects of waiting for the cloud service(s) to answer the question in the human-machine interaction. In 518, Q&A application 135 sends a request to the determine cloud service(s) requesting an answer to the question included in the query and proceeds to 526 as further described below.

In 520, Q&A application 135 selects an optimal behavior including feedback to user 136 intended to reduce a perceived waiting time by the user while waiting for the cloud service(s) to respond. For example, in particular embodiments, Q&A system application 135 selects a behavior that may include inducing a particular robotic movement in a robot, or outputting a particular dialog via an audio output with the intent to reduce the negative effects of waiting time on the user. In one or more embodiments, Q&A application 135 selects the optimal behavior based upon one or more of the determined category and an execution time length of the behavior. In one or more embodiments, Q&A application 135 selects the optimal behavior based upon an estimated response arrival time of the answer from the cloud service(s). In a particular embodiment, Q&A application 135 selects the optimal behavior from available behaviors in the determined category such that a time difference between when the optimal behavior execution ends and the arrival time of the response from the cloud service(s) is minimized.

In 522, Q&A application 135 saves the selected behavior. In 524, Q&A application 135 executes the optimal behavior and process 500 continues to 526. In 526, Q&A application 135 determines whether a response has been received including an answer from the cloud service(s) within a predetermined time period. If a response has been received from the cloud service(s), in 528, Q&A application 135 answers the query by providing the answer received from the cloud server(s) to user 136 and process 500 ends. If a response has not been received from the cloud service(s), process 500 continues to 530.

In 530, Q&A application 135 determines whether a time-out period has expired. The time-out period is indicative of a maximum acceptable time for waiting to an answer to a query from the cloud service(s). If the time-out period has not expired, in 534, Q&A application 135 determines an additional behavior including an additional feedback to the user to reduce the perceived waiting time by the user while waiting for the cloud service(s) to respond. In one or more embodiments, Q&A application 135 determines the additional behavior by selecting a behavior having a shortest execution time length among the available behaviors in the determined category. In particular embodiments, Q&A application 135 avoids reusing the same behavior during the same dialog. Process 500 then returns to 526 in which Q&A application 135 again determines whether the response from the cloud service(s) has been received.

If the time-out period has expired, in 530, Q&A application 135 provides user 136 with an option of asking the question included in the query at a later time or asking a different question in a new query. Process 500 then ends.

Thus, a computer implemented method, system or apparatus, and computer program product are provided in the illustrative embodiments for reducing negative effects of service waiting time in human-machine interaction to improve the user experience and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by a device, a query including a question from a user;
   determining that the question and an associated answer is not found in a local cache of the device;
   identifying, by matching a word in the question with a set of keywords, at least one category of the question;
   determining at least one cloud service for answering the question, the at least one cloud service in communication with the device via a network;
   sending a request including the question to the at least one cloud service;
   selecting, subsequent to identifying the at least one category of the question, a behavior in the at least one category of the question, the behavior including a machine-executable interactive voice-based encoded feedback (feedback) to the user to reduce a perceived waiting time by the user, a content of the feedback selected according to the at least one category of the question and according to user profile data stored in a user profile associated with the user; and
   executing the behavior.

2. The method of claim 1, further comprising:
   determining that a response to the request has not been received from the at least one cloud service within a first predetermined time period;
   selecting an additional behavior, the additional behavior including an additional feedback to the user to reduce the perceived waiting time by the user; and
   executing the additional behavior.

3. The method of claim 2, further comprising:
determining that the response to the request has not been received from the at least one cloud service within a second predetermined time period; and
providing an alternative option to the user.

4. The method of claim 2, wherein selecting the additional behavior includes selecting a behavior having a shortest execution time length among available behaviors in the at least one category.

5. The method of claim 1, further comprising:
determining that a response to the request has been received from the at least one cloud services; and
providing an answer received in a response to the user.

6. The method of claim 1, wherein determining the at least one category of the question includes matching a keyword in the question to a keyword associated with the at least one category.

7. The method of claim 1, wherein selecting the behavior is further based upon an execution time length of the behavior.

8. The method of claim 1, wherein the behavior is selected from available behaviors in the at least one category such that a time difference between when the behavior execution ends and an arrival time of a response from the at least one cloud service is minimized.

9. A computer usable program product comprising one or more computer-readable storage devices, and program instructions stored on at least one of the one or more computer-readable storage devices, the stored program instructions comprising:
program instructions to receive, by a device, a query including a question from a user;
program instructions to determine that the question and an associated answer is not found in a local cache of the device;
program instructions to identify, by matching a word in the question with a set of keywords, at least one category of the question;
program instructions to determine at least one cloud service for answering the question, the at least one cloud service in communication with the device via a network;
program instructions to send a request including the question to the at least one cloud service;
program instructions to select, subsequent to identifying the at least one category of the question, a behavior in the at least one category of the question, the behavior including a machine-executable interactive voice-based encoded feedback (feedback) to the user to reduce a perceived waiting time by the user, a content of the feedback selected according to the at least one category of the question and according to user profile data stored in a user profile associated with the user; and
program instructions to execute the behavior.

10. The computer usable program product of claim 9, further comprising:
program instructions to determine that a response to the request has not been received from the at least one cloud service within a first predetermined time period;
program instructions to select an additional behavior, the additional behavior including an additional feedback to the user to reduce the perceived waiting time by the user; and
program instructions to execute the additional behavior.

11. The computer usable program product of claim 10, further comprising:
program instructions to determine that the response to the request has not been received from the at least one cloud service within a second predetermined time period; and
program instructions to provide an alternative option to the user.

12. The computer usable program product of claim 10, wherein selecting the additional behavior includes selecting a behavior having a shortest execution time length among available behaviors in the at least one category.

13. The computer usable program product of claim 9, further comprising:
program instructions to determine that a response to the request has been received from the at least one cloud service; and
program instructions to provide an answer received in the response to the user.

14. The computer usable program product of claim 9, wherein determining the at least one category for the question includes matching a keyword in the question to a keyword associated with the at least one category.

15. The computer usable program product of claim 9, wherein computer usable code is stored in a computer readable storage device in a data processing system, and wherein the computer usable code is transferred over a network from a remote data processing system.

16. The computer usable program product of claim 9, wherein computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, the stored program instructions comprising:
program instructions to receive, by a device, a query including a question from a user;
program instructions to determine that the question and an associated answer is not found in a local cache of the device;
program instructions to identify, by matching a word in the question with a set of keywords, at least one category of the question;
program instructions to determine at least one cloud service for answering the question, the at least one cloud service in communication with the device via a network;
program instructions to send a request including the question to the at least one cloud service;
program instructions to select, subsequent to identifying the at least one category of the question, a behavior in the at least one category of the question, the behavior including a machine-executable interactive voice-based encoded feedback (feedback) to the user to reduce a perceived waiting time by the user, a content of the feedback selected according to the at least one category of the question and according to user profile data stored in a user profile associated with the user; and
program instructions to execute the behavior.

18. The method of claim 1, wherein the content of the feedback is selected according to a gender of the user, the user profile data comprising the gender.

19. The method of claim 1, wherein the content of the feedback is selected according to an age of the user, the user profile data comprising the age.

20. The method of claim 1, further comprising:
- determining that a second question received from the user and an associated second answer is not found in a local cache of the device;
- identifying, by matching a word in the second question with a set of keywords, at least one category of the second question;
- sending a second request including the second question to the at least one cloud service;
- estimating, based on a plurality of current networking performance indicators, an arrival time for a second response from the at least one cloud service to the second request; and
- selecting a second behavior in the at least one category of the second question, the second behavior including a second feedback to the user to reduce a perceived waiting time by the user, a content of the second feedback selected based on a time difference between an ending time of the second behavior and the arrival time for the second response, the content of the second feedback comprising inducing a particular robotic movement in a robot.

* * * * *